US008580177B2

(12) United States Patent
Van Der Houwen

(10) Patent No.: US 8,580,177 B2
(45) Date of Patent: Nov. 12, 2013

(54) METHOD FOR MANUFACTURING A RESILIENT RAIL SUPPORT BLOCK ASSEMBLY

(75) Inventor: Gerrit Marinus Van Der Houwen, El Haarlem (NL)

(73) Assignee: Edilson Sedra B.V., CN Haarlem (NL)

( * ) Notice: Subject to any disclaimer, the term of this patent is extended or adjusted under 35 U.S.C. 154(b) by 273 days.

(21) Appl. No.: 12/918,927

(22) PCT Filed: Feb. 21, 2008

(86) PCT No.: PCT/NL2008/000052

§ 371 (c)(1), (2), (4) Date: Nov. 3, 2010

(87) PCT Pub. No.: WO2009/104948

PCT Pub. Date: Aug. 27, 2009

(65) Prior Publication Data

US 2011/0036918 A1 Feb. 17, 2011

(51) Int. Cl.
*B29C 45/14* (2006.01)

(52) U.S. Cl.
USPC ........... 264/259; 264/240; 264/241; 264/247; 264/250; 264/251; 264/254; 264/255; 264/260; 264/262; 264/263; 264/271.1; 238/5; 238/7; 238/9; 238/121; 238/122; 238/151; 238/152

(58) Field of Classification Search
USPC ......... 264/259, 241, 251, 255, 265, 267, 268, 264/269, 271.1, 274, 279, 279.1, 296, 264/297.2, 298, 299, 275, 240, 247, 250, 264/254, 260, 262, 263; 238/5, 7, 9, 121, 238/122, 151, 152
See application file for complete search history.

(56) References Cited

U.S. PATENT DOCUMENTS 3,662,952 A * 5/1972 Berks et al. .................. 238/310

FOREIGN PATENT DOCUMENTS

| | | |
|---|---|---|
| DE | 4439816 A1 | 5/1996 |
| EP | 1908881 A1 | 4/2008 |
| ES | 1065079 U | 6/2007 |
| FR | 2845700 A1 | 4/2004 |
| GB | 1538997 | 1/1979 |

* cited by examiner

*Primary Examiner* — Jeff Wollschlager
*Assistant Examiner* — Stella Yi
(74) *Attorney, Agent, or Firm* — Tutunjian & Bitetto, P.C.

(57) ABSTRACT

A rail support block assembly includes a resilient member and a molded block having a top, a bottom and peripheral wall. The block is adapted for fastening one or more rails on the top. The prefabricated resilient member has an outer tray and inner tray arranged within the outer tray, and includes a resilient intermediate structure between the trays. The block is molded. The block is fixed in the inner tray to extend under the bottom of the block and along a lower region of the peripheral wall. The resilient member may form a part of the block mold, so that a mold member combined with the resilient member delimit the mold for the block. The moldable material is introduced and adheres directly to the inner tray of the prefabricated resilient member.

16 Claims, 2 Drawing Sheets

METHOD FOR MANUFACTURING A RESILIENT RAIL SUPPORT BLOCK ASSEMBLY

TECHNICAL FIELD

The present invention relates to the field of supporting rails of a railway track, such as for trains, underground, trams, etc.

BACKGROUND

In the field of railway track technology, systems have been developed to reduce or hinder, in particular, noise and vibration.

In a known arrangement, a rail of a railway track is supported on rail support blocks arranged at intervals under the rail. These blocks are embedded in a concrete slab. The slab is commonly poured around the blocks, but it is also known to place the blocks in corresponding cavities in a slab. To reduce noise and vibrations resulting from rail vehicles passing over the railway a resilient member is present between each block and the slab.

In a known system developed by the present applicant, a resilient rail support block assembly is manufactured, which is ready to be mounted to the rail to be supported. The assembly includes a concrete block adapted for fastening the rail on the top of the block. This assembly further includes a concrete tray extending below and spaced from the bottom of the block as well as around and spaced from the lower region of the peripheral wall of the block. A resilient material, such as sold under the trade name Corkelast, has been poured during manufacture of the assembly between the concrete tray and the block. Upon polymerisation (while maintaining its resilient property) the resilient material adheres to the concrete block and concrete tray and thus bonds said tray to the block. When installing a rail, the known rail support block assemblies are positioned at intervals along the rails and fastened thereto. Thereafter a slab of concrete is poured, so that the concrete trays are embedded in and become integral with the slab. This method is known in the art as the "fix and forget method".

In ES1065079U the present applicant describes an improved resilient railway block assembly. In this document the resilient rail support block assembly, comprises a prefabricated resilient member as well as a block. The prefabricated resilient member is adapted to be fixed to said block so as to extend under the bottom of the block as well as around at least a lower region of the peripheral wall of the block. The prefabricated resilient member comprises an outer tray and inner tray arranged within said outer tray, and said prefabricated resilient member further comprises a resilient intermediate structure being arranged between said outer and inner trays.

As mentioned in ES1065079U, the installation of a lengthy stretch of railway requires a very large number of rail support block assemblies. Therefore the present invention aims to provide a highly efficient and reliable manufacturing method for rail support block assemblies which include a prefabricated resilient member of the type disclosed in ES1065079U.

SUMMARY

The present invention achieves said aim by providing a method, wherein the prefabricated resilient member is used to form a part of the block mould, so that one or more additional mould members combined with said prefabricated resilient member delimit the block mould, the mouldable material being introduced into said block mould and thereby adhering directly to the inner tray of the prefabricated resilient member.

In a preferred practical embodiment of said manufacturing method, the prefabricated resilient member is manufactured at a first site, preferably at a company specialized in resilient intermediate structures for railway applications. At a second, remote site, preferably at a company specialized in manufacture of concrete building products, the prefabricated resilient member is combined with one or more additional block mould members to form the block mould. Then mouldable material is introduced into the block mould and allowed to harden. Thereby the material of the block adheres directly to the inner tray of the prefabricated resilient member. The completed railway support block assembly is then transported to the railway installation site.

Compared to the method disclosed in ES1065079U, the efficiency is increased and a reliable adherence is obtained. Also no adhesive or mortar, such as, e.g., a suitable epoxy, has to be introduced in a separate step to fix the block to the inner tray.

The block could be embodied as a monolithic sleeper with rail fasteners for supporting two or more parallel rails, a railway switch or the like.

As is known in the field of railway tracks, two blocks may be interconnected by one or more transverse tie bars, either permanently or temporarily, preferably prior to installation. In a possible embodiment of the inventive method, it is envisaged that at least one transverse tie bar securing element is positioned so as to extend at least partly within the block mould prior to the introduction of the mouldable material, so said transverse tie bar securing element is directly integrated in the block. This allows one to interconnect pairs of such resilient rail block assemblies by provision of one or more transverse tie bars, which are then secured to said securing elements, preferably prior to shipment to the installation site.

In an alternative embodiment of the inventive method, two block moulds are positioned next to one another at a suitable spacing, and—prior to introduction of mouldable material into the block moulds—one or more transverse tie bars are positioned so as to extend with their ends into each of the block moulds, so that upon introduction of the mouldable material said transverse tie bar ends are directly integrated in the blocks.

Preferably the inner and outer trays are more rigid than the resilient intermediate structure.

Preferably the inner and outer trays each have a bottom and a raised peripheral wall.

Preferably the outer and inner trays are spaced from one another so as to have no points of contact.

Preferably the resilient intermediate structure preferably is essentially composed of, an elastomeric material, e.g. a polyurethane elastomeric material.

Preferably the outer tray has an exterior surface provided with anchoring formations to enhance the engagement of the outer tray with a concrete slab.

Preferably the outer and inner trays are made of a plastic material.

BRIEF DESCRIPTION OF THE DRAWINGS

The invention will be discussed in more detail below referring to the drawings. In the drawings.

DETAILED DESCRIPTION OF PREFERRED EMBODIMENTS

Figure 1:
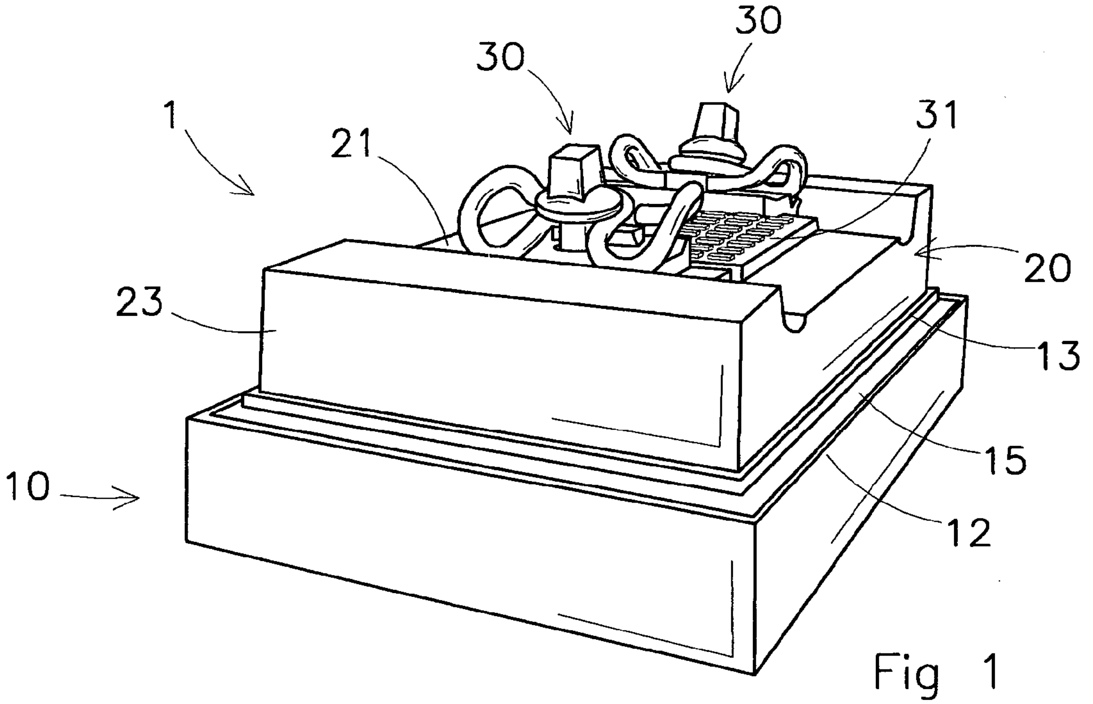
FIG. 1 shows a railway support block assembly manufactured according to the method of the present invention.

In FIG. 1, an example of a resilient rail support block assembly 1 made in accordance with the method of the present invention is shown.

The assembly 1 includes a prefabricated resilient member 10 which has an outer tray 12 and an inner tray 13 arranged within said outer tray 12. A resilient intermediate structure 15 is arranged between said outer and inner trays 12, 13.

The assembly 1 further includes a railway support block 20. This block 20 here is made of a mouldable, preferably pourable, material. Preferably the block 20 is made of concrete. It is envisaged that said concrete can be a polymer concrete. Other concrete containing embodiments of the block, e.g., including reinforcement materials, are also envisaged.

The block 20 has a top 21, a bottom and peripheral wall 23. Here the block 20 is adapted as a monoblock for supporting a single rail of a railway track, but the block could also be designed as a duo-block supporting two or even more rails (as a railway sleeper). The block 20 here has a significant height.

In order to fasten the rail to the top 21 of the block 20 one or more rail fastener members 30 are provided on the block 20. Also an elastic plate 31 is positioned here on top of the block 20, which will lie under the rail.

The trays 12, 13 here generally have a bottom, here a rectangular bottom, and a raised peripheral wall and are open from above.

The skilled person will appreciate that other general shapes of the trays are possible, for instance depending on the shape of the block, such as an oval outer contour, a trapezium shaped outer contour, a hexagonal block, etc.

The inner tray 13 has dimensions here so that it can be held spaced from the outer tray 12 in all directions. In practical terms said distance between the main faces of the inner and outer trays 12, 13 generally is preferably at least 5 millimeters and preferably at most 20, more preferably at most 15 millimeters.

The resilient intermediate structure 15 is arranged between said outer and inner trays 12, 13 and here also interconnects said trays 12, 13 so as to form a unitary assembly with said trays, preferably as said structure 15 is bonded to the faces of each of the trays 12, 13.

Here, in a preferred embodiment, the resilient structure 15 has been obtained by arranged the trays 12, 13 spaced from each other and then pouring (or similar) a suitable elastomeric material between the outer and the inner tray 12, 13. As the material has been poured (or similar) between the trays 12, 13, the material bonds to essentially the entirety of the main faces of the inner and outer trays 12, 13, preferably so that no interface exists which would allow for the ingress of water or the like.

The resilient intermediate structure 15 thus both serves to interconnect the trays 12, 13 so as to form a unitary prefabricated resilient member 10 and also to provide a sound and/or vibration attenuating support of the rail support block 20 when the assembly is embedded in a slab or mounted on another substructure.

The outer and inner trays 12, 13 are spaced from one another so as to have no points of contact and the intermediate resilient layer 15 allows for elastic motion of the inner tray (which will receive the block) in all directions.

Here, as is preferred, the inner and outer trays 12, 13 are more rigid than the resilient intermediate structure 15.

In practice the trays 12, 13 can be from materials as plastic, (fibre) reinforced plastic, composite plastic material, metal, or even wood. Plastic material is preferred and the trays 12, 13 can, e.g., be injection moulded or formed from plastic sheet material. The plastic material could, e.g., be a polyurethane polymer or an ABS polymer.

The elastomeric material of structure 15 and the trays 12, 13 are preferably designed and selected such that a strong adherence or bond is obtained between the inner faces of the trays and the elastomeric material. For instance, the elastomeric material can be a polyurethane elastomer, such as, e.g., Corkelast made by the applicant.

In general, the FIG. 1 shows a sandwich type prefabricated resilient member, wherein a layer of the elastomeric material 15 is sandwiched between the trays 12, 13.

The resilient intermediate structure 15, here layer of elastomeric material 15, is adapted to maintain its resiliency during its service life. For instance, said structure 15 (and the resilient assembly in which it is integrated) should be able to serve in railways lines as specified in UIC code 700, “Classification of lines and resulting load limits for wagons”, a relevant code of the International Union of Railways.

The inner faces of the trays 12, 13 are preferably made with an adhesion enhancing surface, e.g., rough and/or provided with adhesion enhancing formations, such as ribs, lugs, etc.

The inner faces of the trays 12, 13 can be subjected to an adhesion enhancing pre-treatment, e.g. a mechanical treatment or a chemical treatment.

The trays 12, 13 can be made from the same or from different materials. E.g., the inner tray could be made from plastic and the outer tray of metal. A metallic outer tray would result in a high resistance against damage and/or penetration of the outer tray possibly affecting the functioning of the resilient material. A metallic outer tray, e.g., of steel, could also be chosen as it could allow for mounting or integrating the tray into a steel structure, e.g. on a steel plate or on a steel member of a railway bridge or the like. The steel outer tray could be provided, e.g., with a flange which can be fastened to said further steel structure.

Also the wall thickness of the trays 12, 13 could be the same or differ e.g. depending on the selected material and/or application.

The inner tray may, at its upper rim, be provided with a labyrinth to enhance the adherence to the block along said upper rim and to avoid release of said upper rim from the block 20 and so avoid entry of water.

The trays 12, 13 or one of them could be made from an electrical insulation material. The intermediate resilient structure 5 also could have electrically insulating properties.

It can also be envisaged that one or more preformed elastic elements, e.g., an elastic mat or plate (e.g. of a suitable foam), are placed between the trays 12, 13 and possibly adhered to both trays using a suitable adhesive.

The use of one or more preformed flexible foam element(s) between the bottoms of the trays is, e.g., envisaged to obtain a softer support of the rail(s).

When using one or more preformed elastic elements between the trays, any remaining spaces between the trays 12, 13 are filled with a pourable elastomeric material, as explained with regard to structure 15.

It is shown here that the top 21 of the block 20 is spaced vertically from the top edge of the trays 12, 13.

To enhance the embedding of the outer tray 12 into a railway slab or the like, the outer tray 12 can have a roughened exterior and/or anchoring formations (e.g. ribs(s), lug(s), bolts or pins, etc. protruding outwards from the tray 12).

In a practical embodiment, the outer tray on the outside and/or the inner tray on the inside can be roughened by provision of a rough mineral coating, e.g., crushed pebbles, rock, gravel, etc. This crushed material can be fixed with an adhesive, e.g. epoxy, to the respective face of the tray.

In another practical embodiment the outer tray (e.g., on the outside) and/or the inner tray (e.g., on the inside) can be provided, preferably during the production of the prefabricated resilient member, with a sheet (or sheets) of a 3-dimensional open structure, having openings/interstices therein so that concrete or other pourable material can enter into said openings/interstices and so enhance the anchoring of the tray face to said material. For instance, the sheet is provided on its surface with loops (e.g. of plastic or metal filament), mushroom-shape projections or other shapes of hooks or anchoring members (e.g., as in hook and loop fasteners).

It is also envisaged to have the outer tray 12 with inward sloping peripheral wall or parts thereof, so that the embedded outer tray cannot be pulled upwards out of the slab.

A tray could be provided with one or more perforations.

In an embodiment (not shown), the assembly is not embedded but fastened onto a substructure, e.g., on a substructure plate (metal or concrete) or a beam.

A preferred embodiment of the method for manufacturing the assembly 1 will now be explained in more detail referring to the schematic FIG. 2.

Figure 2:
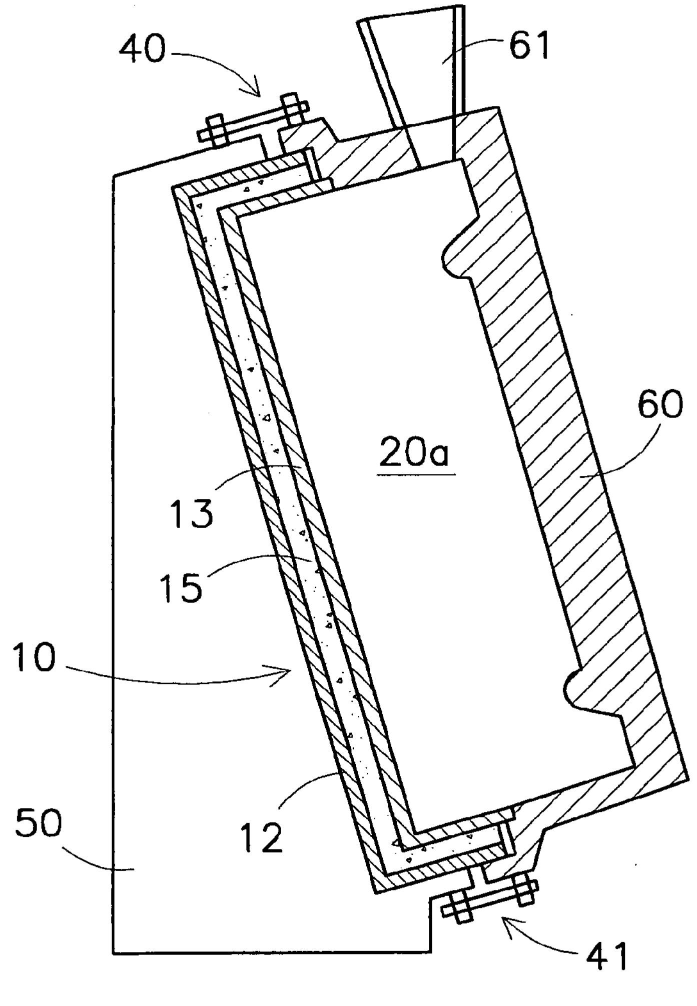
FIG. 2 shows schematically in cross-section, an example of a manufacturing method according to the present invention.

In FIG. 2, the prefabricated resilient member 10 is shown, which has been placed on an associated support 50 of a moulding installation. The support 50 may, e.g., be part of a carrousel device having multiple supports 50.

Placed against the open top side of the prefabricated resilient member 10 is an additional block mould member 60, which combined with the prefabricated resilient member 10 delimits the block mould for the block 20 by forming the corresponding block cavity 20*a*.

Releasable retaining means, here schematically indicated at 40,41, may be used to retain the additional block mould member 60 in its position against the member 10, preferably so as to obtain a seal between said member 60 and the upper edge of the inner tray 13. A compressible sealing member or other sealing arrangement may be provided at said interface.

The mouldable material that forms the block 20, e.g., concrete, is introduced into the block mould in a suitable manner and thereby adheres directly to the inner tray of the prefabricated resilient member. Thus, the block 20 is made and fixed in the inner tray in a single step, which avoids the extra step of fixing a prefabricated block to the inner tray and its associated problems.

As is preferred the mouldable material is made by a suitable preparation device.

As is preferred the material is introduced into the mould via a introduction or filling opening 61 provided in the additional mould member 60.

In an alternative method the prefabricated resilient member 10 could be provided with an introduction or filling opening, from which the mouldable material is cleared after filling the mould cavity and preferably replaced by a resilient material plug (preferably waterproof), so that the hardened mouldable material does not interfere with the resilient action of the structure 15 between the inner and outer trays.

As is preferred the introduction or filling opening 61 is located on a face of the mould forming a side of the periphery of the block 20. This keeps any irregularities caused by the filling away from the top 21 of the block 20. Top 21 usually has to meet strict specifications.

In addition to one or more introduction openings 61, the block mould may be provided with one or more air escape openings that allow air to escape as the cavity 20*a* is filled.

As is preferred, the support 50 is such that the prefabricated resilient member 10 is arranged thereon—at least during introduction of the mouldable material—with its opening in lateral orientation, so with the bottom of the member 10 substantially upright, most preferably the bottom having an angle between 50 and 85 degrees with respect to the horizontal. Such a more or less vertical orientation is advantageous with respect to avoiding air pockets and associated incomplete adherence of the block to the inner tray.

It will be appreciated that a horizontal positioning of the member 10 is also possible during the step of introducing the mouldable material, even as a positioning of the member 10 on top of the additional block mould member 60.

During and/or after introduction of the mouldable material into the cavity 20*a* the support 50 may be subjected to vibrations, so as to densify the material and avoid air pockets.

As the material introduced into the block mould cavity 20*a* is allowed to harden, it will then adhere to the inner tray and achieve fixation of the block 20 to the inner tray 13.

As will be appreciated, the mould member 60 defines the portion of the block 20 which protrudes upwardly from the inner tray. If desired, instead of a single dome shaped mould member 60, several mould members could be provided that in combination delimit the mould cavity 20*a* for the upper portion of the block.

If desired, prior to the introduction of the mouldable material into the cavity 20*a*, one or more reinforcement elements, preferably of metal, are positioned in the mould cavity 20*a*, so as to obtain a reinforced block. For example a reinforcement element could be fixed to the inner tray 13, e.g. with a snap-fit, prior to the introduction of the mouldable material.

If desired one or more rail fastener members are positioned at least with a portion thereof within the block mould prior to the introduction of the mouldable material, so that said one or more rail fastener members are directly integrated in the block and fixed to the block material. Such rail fastener members could be fitted through corresponding openings in the additional mould member 60, so that a portion of a rail fastener member extends into the cavity and is directly embedded and fixed in the material of the block 20.

If desired, an elastic plate which will lie under the rail is positioned within the block mould prior to the introduction of the mouldable material, so that said elastic plate is directly integrated in the block.

If desired at least one transverse tie bar securing element is positioned so as to extend at least partly within the mould prior to the introduction of the mouldable material, so said transverse tie bar securing element is directly integrated in the block. When such block assemblies are manufactured, a further step could be that pairs of resilient rail block assemblies are interconnected by a transverse tie bar, preferably prior to shipment to the installation site of the railway track.

In a possible embodiment two block moulds are positioned next to one another at a suitable spacing, and—prior to introduction of mouldable material into the block moulds—one or more transverse tie bars are positioned so as to extend with their ends into each of the block moulds, so that upon introduction of the mouldable material said transverse tie bar ends are directly integrated in the blocks.

A suitable manufacturing facility may include a station wherein a prefabricated resilient member 10 is placed on a movable support 50, application of the one or more mould members to obtain the mould with cavity 20*a*, moving the support with the mould to a filling station where a suitable material is introduced into the mould, moving the support with the mould to a hardening station (or removing the mould from the support and placing the mould in the hardening station).

It is envisaged that a manufacturing facility is made so as to be transportable to a location close to the railway installation site.

The present invention also relates to a manufacturing facility for manufacturing a resilient rail support block assembly as disclosed herein, wherein the facility comprises:

- a support for the prefabricated resilient member,
- one or more additional mould members to be combined with the prefabricated resilient member to form a mould for the block,
- a mouldable material preparation device,
- an introduction station, where said mouldable material is introduced into the mould.

Figure 3:
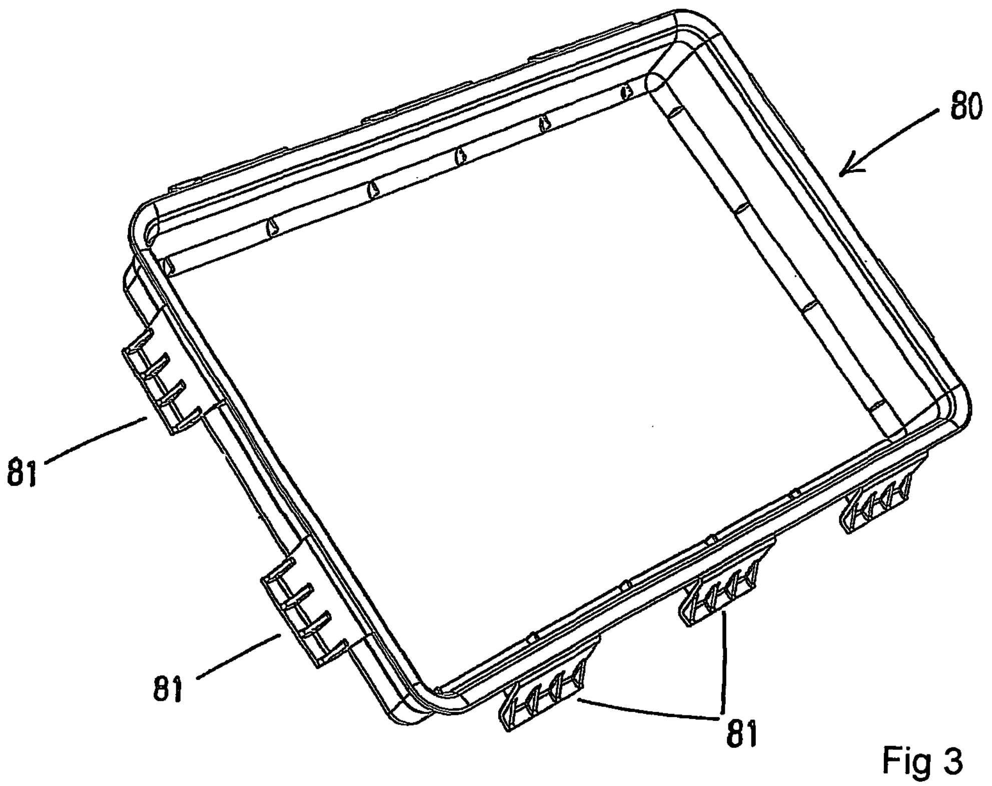
FIG. 3 shows an example of an inner tray.

FIG. 3 shows an example of an outer tray 80 of a prefabricated resilient member to be used in the method of the invention. This tray 80 is injection moulded from suitable plastic material. The outside of the tray 80 includes anchoring members 81 which are to be embedded in the hardenable material that is to be poured around the tray 80.

Figure 4:
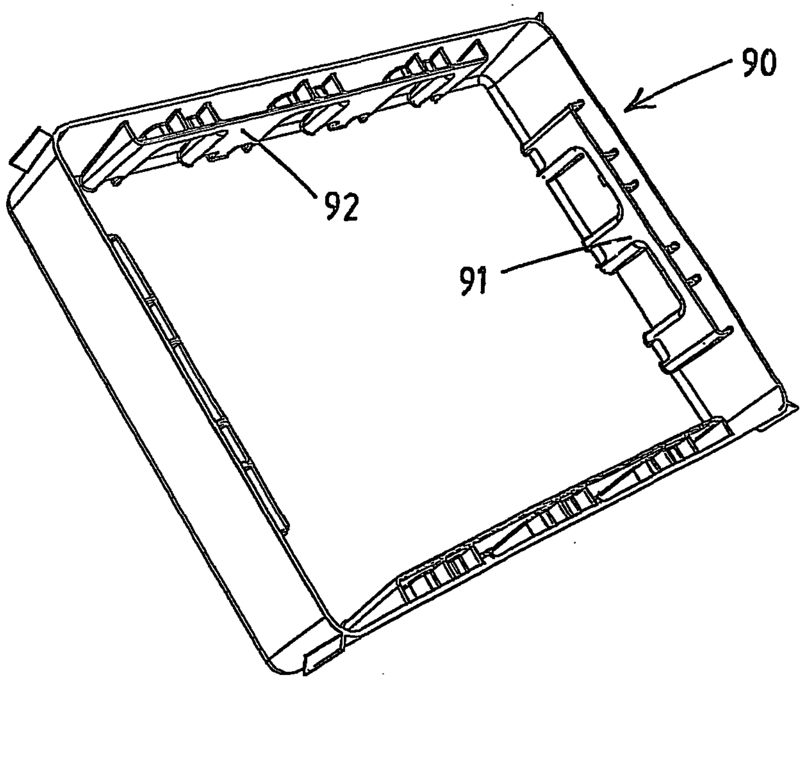
FIG. 4 shows an example of an outer tray.

FIG. 4 shows an example of inner tray 90 that is to be positioned within tray 80 with interposition of a resilient intermediate structure as disclosed herein. As can be seen the inside of the inner tray 90 is provided with anchoring members 91, 92 which enhance the anchoring to the mortar or other adhesive that connects the inner tray 90 to the block. As can be seen in this example the anchoring members are co-moulded with the tray. Also the anchoring members 91, 92 in this example include wall section spaced inward from the tray and connected to said tray via ribs.

The invention claimed is:

1. A method for manufacturing a resilient rail support block assembly, which assembly is adapted to be embedded in or mounted on a railway substructure and which assembly comprises a prefabricated resilient member and a moulded block having a top, a bottom and peripheral wall, said block being adapted for fastening one or more rails on the top of said block, wherein the prefabricated resilient member has an outer tray and inner tray arranged within said outer tray, and wherein said prefabricated resilient member comprises a resilient intermediate structure arranged between said outer and inner trays, and wherein the block is moulded, in a block mould, with a mouldable material, which is introduced and allowed to harden, and wherein the block is fixed in the inner tray so as to extend under the bottom of the block and along at least a lower region of the peripheral wall of the block, wherein the prefabricated resilient member is used to form a part of the block mould, so that one or more additional block mould members combined with said prefabricated resilient member delimit a mould cavity for the block, the mouldable material being introduced into said mould cavity and thereby adhering directly to the inner tray of the prefabricated resilient member.

2. Method according to claim 1, wherein the block is molded with a lower portion around which the inner tray extends and with an upper portion upwardly protruding from the inner tray, and wherein the one or more additional block mould members delimit a portion of the mould cavity that forms the upper portion of the block.

3. Method according to claim 2, wherein use is made of a single dome shaped additional block mould member that is placed against the prefabricated resilient member and that forms the upper portion of the block.

4. Method according to claim 1, wherein the prefabricated resilient member is arranged during introduction of the mouldable material with an open side thereof in a lateral orientation, the prefabricated resilient member having an angle between 50 and 85 degrees with respect to the horizontal.

5. Method according to claim 2, wherein the one or more additional block mould members include one or more introduction openings for the mouldable material.

6. Method according to claim 1, wherein prior to the introduction of the mouldable material one or more reinforcement elements are positioned in the block mould, so as to obtain a reinforced block.

7. Method according to claim 6, wherein a reinforcement element is fixed to the inner tray prior to the introduction of the mouldable material.

8. Method according to claim 1, wherein one or more rail fastener members are positioned at least with a portion thereof within the block mould prior to the introduction of the mouldable material, so that said one or more rail fastener members are directly integrated in the block and fixed to the mouldable material as said mouldable material hardens.

9. Method according to claim 1, wherein an elastic plate which will lie under the rail is positioned within the block mould prior to the introduction of the mouldable material, so that said elastic plate is directly integrated in the block.

10. Method according to claim 1, wherein at least one transverse tie bar securing element is positioned so as to extend at least partly within the block mould prior to the introduction of the mouldable material, so said transverse tie bar securing element is directly integrated in the block.

11. Method according to claim 10, wherein pairs of resilient rail block assemblies are interconnected by a transverse tie bar.

12. Method according to claim 1, wherein two block moulds are positioned next to one another at a suitable spacing, and wherein—prior to introduction of mouldable material into the block moulds—one or more transverse tie bars are positioned so as to extend with their ends into each of the block moulds, so that upon introduction of the mouldable material said transverse tie bar ends are directly integrated in the blocks.

13. The method of claim 1, further comprising the step of providing a releasable retaining means retaining the one or more additional block mould members against the prefabricated resilient member so as to maintain a seal between the one or more additional block mould members and an upper edge of the inner tray.

14. The method of claim 1, further comprising the step of removing the one or more additional block mould members after hardening of the mouldable material to obtain the support block assembly.

15. The method of claim 1, wherein at least one of the inner and outer trays is comprised of plastic sheet material of a 3-dimensional open structure having interstices.

16. The method of claim 1, wherein the outer tray includes inward sloping peripheral walls.

* * * * *